(12) United States Patent
Kennedy, Jr.

(10) Patent No.: US 11,586,607 B2
(45) Date of Patent: *Feb. 21, 2023

(54) QUERY PROCESSOR

(71) Applicant: Vinyl Development LLC, Miami Beach, FL (US)

(72) Inventor: Thomas R. Kennedy, Jr., Miami Beach, FL (US)

(73) Assignee: Vinyl Development LLC, Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/662,710

(22) Filed: Oct. 24, 2019

(65) Prior Publication Data

US 2020/0125551 A1  Apr. 23, 2020

Related U.S. Application Data

(63) Continuation of application No. 14/963,674, filed on Dec. 9, 2015, now Pat. No. 10,496,632.

(51) Int. Cl.
*G06F 16/24* (2019.01)
*G06F 16/23* (2019.01)
(Continued)

(52) U.S. Cl.
CPC ........ *G06F 16/2365* (2019.01); *G06F 16/245* (2019.01); *G06F 16/2433* (2019.01); *G06F 16/2455* (2019.01); *G06F 16/252* (2019.01)

(58) Field of Classification Search
CPC .. G06F 16/2365; G06F 16/245; G06F 16/252; G06F 16/2433; G06F 16/2455
See application file for complete search history.

(56) References Cited

U.S. PATENT DOCUMENTS 7,657,881 B2  2/2010  Nagendra et al.
9,185,125 B2  11/2015  Varsanyi et al.
(Continued)

OTHER PUBLICATIONS

International Search Report and Written Opinion received in connection with corresponding PCT Appl No. PCT/US2016/065783, dated Jan. 12, 2017.
(Continued)

*Primary Examiner* — Alicia M Willoughby
(74) *Attorney, Agent, or Firm* — Fish & Richardson P.C.

(57) ABSTRACT

Methods, systems, and apparatus, including computer programs encoded on computer storage media, for a source independent query language. One of the methods includes receiving a first executable statement, the first executable statement referencing a second set of fields in a table in a relational database, the first executable statement having instructions to cause the database to perform operations on data in the table. The method includes generating a second executable statement based on the first set of fields and the first executable statement. The method includes determining a mapping between the first set of fields and the second set of fields. The method includes specifying a derived table using the corresponding values and the mapping. The method includes generating instructions to cause the database to perform the operations on the derived table. The method includes sending the second executable statement to the database.

20 Claims, 8 Drawing Sheets

(51) Int. Cl.
  *G06F 16/2455* (2019.01)
  *G06F 16/245* (2019.01)
  *G06F 16/25* (2019.01)
  *G06F 16/242* (2019.01)

(56) References Cited

U.S. PATENT DOCUMENTS

| | | | |
|---|---|---|---|
| 9,275,099 | B1 | 3/2016 | Kennedy |
| 9,547,687 | B2 | 1/2017 | Kennedy |
| 9,886,483 | B1 * | 2/2018 | Harrison ............ G06F 16/28 |
| 10,496,632 | B2 | 12/2019 | Kennedy |
| 10,558,644 | B2 | 2/2020 | Kennedy |
| 2004/0226031 | A1 | 11/2004 | Zimmerman et al. |
| 2005/0289125 | A1 | 12/2005 | Liu |
| 2006/0134712 | A1 | 6/2006 | Stromgren et al. |
| 2007/0027905 | A1 | 2/2007 | Warren |
| 2007/0038985 | A1 | 2/2007 | Meijer |
| 2007/0169017 | A1 | 7/2007 | Coward |
| 2008/0222616 | A1 | 9/2008 | Cheng et al. |
| 2010/0036801 | A1 | 2/2010 | Pirvali |
| 2010/0114932 | A1 | 5/2010 | Whitcher et al. |
| 2010/0185645 | A1 * | 7/2010 | Pazdziora ............ G06F 16/242 707/760 |
| 2010/0306220 | A1 | 12/2010 | Sthankikam et al. |
| 2011/0209131 | A1 | 8/2011 | Hohenstein et al. |
| 2012/0166238 | A1 * | 6/2012 | Mohanty ............ G06Q 10/063 705/7.11 |
| 2013/0166539 | A1 * | 6/2013 | Clark ............ G06F 16/2452 707/722 |
| 2013/0339293 | A1 | 12/2013 | Witten |
| 2014/0172833 | A1 | 6/2014 | Taylor |
| 2014/0214890 | A1 * | 7/2014 | Johnson ............ G06F 16/278 707/770 |
| 2014/0214897 | A1 | 7/2014 | Zhu |
| 2014/0244680 | A1 | 8/2014 | Chandran |
| 2014/0258341 | A1 | 9/2014 | Mazoue |
| 2014/0279837 | A1 | 9/2014 | Guo et al. |
| 2015/0227135 | A1 | 8/2015 | Mcadam et al. |
| 2015/0317361 | A1 | 11/2015 | Battaglia |
| 2016/0026680 | A1 | 1/2016 | Banerjee |
| 2017/0169068 | A1 | 6/2017 | Kennedy, Jr. |
| 2017/0262498 | A1 | 9/2017 | Kennedy |

OTHER PUBLICATIONS

International Search Report and Written Opinion for corresponding Appl No. PCT/US17/21386, dated May 25, 2017.
PCT International Preliminary Report on Patentability in International Appln. No. PCT/US17/21386, dated Sep. 20, 2018, 7 pages.
PCT International Preliminary Report on Patentability in International Appln. No. PCT/US2016/065783, dated Jun. 21, 2018, 7 pages.

* cited by examiner

QUERY PROCESSOR

CROSS-REFERENCE TO RELATED APPLICATIONS

The present application is a continuation of, and claims benefit under 35 USC 120 to, U.S. application Ser. No. 14/963,674, filed on Dec. 9, 2015. The entire disclosure of this application is incorporated by reference herein.

BACKGROUND

This specification relates to graphical user interfaces.

Data validation is the process of verifying that a program operates on clean, correct and useful data. Data validation processes use routines that check for correctness, meaningfulness, and security of data that are input into the system. Validation can be performed on the client-side (for example, on a presented web page) or on the server side. Client side validation general includes the use of scripting languages. Server side validation may be written in a conventional programming language.

SUMMARY

The system described herein enables queries to be written once and executed against in-memory data as well as data persistently stored in a database. The statement is modified to perform functions against the data stored in varying different data stores. For example, the data on the user interface can be mapped into fields referenced in the statement. Data stored in NoSQL databases can be accessed using the statement.

In general, one innovative aspect of the subject matter described in this specification can be embodied in methods that include the actions of obtaining a SQL statement according to a first syntax, the SQL statement including a first set of operations according to the first syntax. The methods include the actions of identifying a command syntax based on a target data store for the SQL statement. The methods include the actions of generating at least one command according to the command syntax, the at least one command capable of instructing the target data store to perform the first set of operations. The method includes the action of providing the one or more commands to the target data store.

Particular embodiments of the subject matter described in this specification can be implemented to realize one or more of the following advantages. Using the same statement to validate data on a user interface and data stored in a database has the advantages of reducing the number of programs that need to be developed and maintained. The costs associated with developing, testing, and maintaining a computer program or application are thereby reduced.

The foregoing and other embodiments can each optionally include one or more of the following features, alone or in combination. The target data store may be a NoSQL database. The command syntax may be a proprietary variation of the SQL programming language. The methods may include the actions of identifying an operation not supported by the target data store, and determining a function from a function library capable of performing the operation. The methods may include the actions of determining whether the operation applies to an input or an output, and in response to determining the operation applies to an input performing the function against information provided in the SQL statement and including a result of the function in the at least one commands. The methods may include the actions of determining whether the operation applies to an input or an output and in response to determining the operation applies to an output generating the at least one command absent the operation, providing the at least one command to the target data store, and applying the function to a result provided by the target data store in response to the at least one command.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The system described herein allows data validation procedures to be written once and then executed on client data, server data, or stored persistent data.

Data validation may be performed on a client or a server. Generally, performing validation on the client provides for a better user experience while performing data validations on a server is more reliable. It is not uncommon for a system to perform data validations twice. Data may be validated a first time on the user interface and a second time when the data is stored in a persistent database. Some systems do a periodic data cleansing, where the data stored in the database is validated for a third time.

On a conventional hyper-text markup language (HTML) web page delivered to a remote device using the hypertext transport protocol (HTTP), client side validations can be performed using client side scripting (programs specifically developed to access and manipulate items presented in a web browser); however, because the system does not control all data that is transmitted from the client, the application generally re-validates the data prior to persisting it to the database. Using conventional techniques, the script that is used to validate data on the client cannot be reused to validate the data before it persists or after it has been stored. Instead, the data validation is programmed a second time in a conventional programming language.

Periodically a company may choose to audit the integrity of their data (for example, to determine if programming errors, human error, or other issues (such as data corruption or management override) has caused otherwise invalid data to be inserted into the database). Validations to perform this audit are designed to perform operations on a large number of data records at once, therefore, they are generally programmed for a third time using a database query language, such as SQL or a variant thereof.

Spreading the data integrity and business rules across three tiers (database, application server, rich client) and potentially three languages (SQL, server-side, client-side) leads to duplication and maintenance issues. For example, client side validation may be performed using a scripting language, such as JAVASCRIPT. Server-side validation may be performed using a conventional programming language, such as JAVA or C++. Database validations may be performed using database constraints or databased queries (for example, SQL).

Traditionally, a SQL query selects data that's stored in a table within a database. Executing the query requires the data to be persisted to the database.

Figure 1:
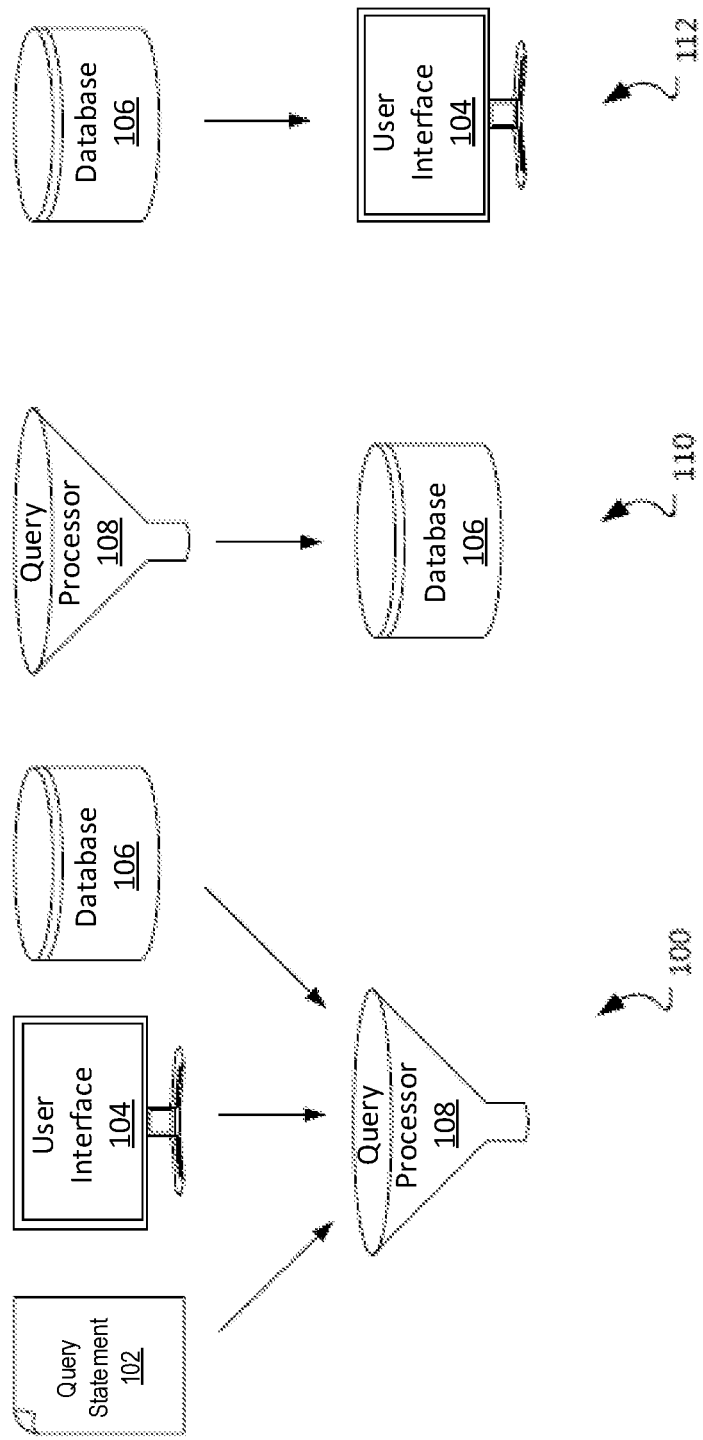
FIG. 1 illustrates an example of executing mvSQL code against data from a user interface.

FIG. 1 illustrates an example of executing mvSQL code against data from a user interface. Referring to a first section 100 of the figure, a query processor 108 accepts a mvSQL statement 102 and data from a user interface 104. In some implementations, the query processor 108 also accepts a data definition from, for example, a database 106. While the disclosure herein refers to mvSQL, the processes and systems described herein are not limited to mvSQL in particular and can be applied to any query language that can be transformed into a computer-executable statement.

As used herein a query processor is distinct from a query interpreter. Query interpreters is generally part of a database system. The query interpreter can perform query optimization and query execution. Query optimization is the process of choosing an appropriate solution for query execution. Often there are several different ways to perform a query, many leading to the same correct result. The job of the query processor is to create one or more access plans for a given query. If several possible solutions exist that give the correct query result, the query interpreter select the access plan for the query. Query execution is causing the query to perform the actions described by the query. The actions can be, for example, obtaining data, updating data, deleting data, and inserting data. A query interpreter may exist within a database system or may be a standalone product.

In general, data storage systems (databases) accept a set of commands according to a syntax to allow external systems to access and manipulate the data. Some databases accept SQL statements, some databases provide application programming interfaces (APIs). The APIs can take a number of different forms including but not limited to SOAP messages, remote procedure calls, HTTP interfaces, and streaming interfaces, Example of a non-SQL interface also include file systems. The system can treat a file system as a database including two tables. One table enumerates the files. To retrieve a list of files within a directory, the developer might build an mvSQL query such as:
SELECT FileName
FROM Files
WHERE Directory='system:data'
AND Type='File'

When the system is executing within ASP.Net, the mvSQL statement may be translated into:
string directory=HostingEnvironment.MapPath("~/App_Data");
var files=Directory.GetFiles(directory);

In this example, the HostingEnvironment.MapPath function is provided by ASP.Net. It resolves paths relative to the web root directory. The Directory class is provided by the .Net Framework. It's part of the API used to interact with the file system when running on a server operating system like Windows. The system may use a different API when running on a phone (Android, iOS).

The second table can provide access to file content.
SELECT Content
FROM File
WHERE Path=system:data/logs.txt'
That would end up executing code such as:

```
string directory = HostingEnvironment.MapPath("~/App_Data");
string filePath = Path.Combine(directory, "logs.txt")
using (StreamReader reader = new StreamReader(filePath))
{
    string fileContent = reader.ReadToEnd( );
}
```

The file system data provider is one example of where mvSQL maps to a non-SQL API. Another example includes the open data protocol (OData). OData is a standard for representational state transfer (RESTful) web services.

The developer may construct a mvSQL query to select the top ten most expensive products in the category "Beverages". That might look something like this:
SELECT Name, Price
FROM Products
WHERE Category='Beverages'
ORDER BY Price DESC
LIMIT 10

The system may interpret that mvSQL query and send the following HTTP request to an OData service:
http://example.com/service/Products?$select=Name, Price&$filter=Category eq 'Beverages'&$orderby=PRICE desc&$top=10

A mvSQL statement is a version of a SQL query language that can be converted into other versions of the SQL query language or other data access methods and commands. The mvSQL language can have its own syntax. In general, SQL is a special-purpose programming language designed for managing data held in a relational database management system (RDBMS) or for stream processing in a relational data stream management system (RDSMS). While SQL serves as a rough standard, different RDBMS vendors have constructed their own versions of SQL (each with their own command syntax). For example, ORACLE, SQLSERVER, and DB2 (all relational database vendors) each have their own proprietary SQL syntax. mvSQL is a version of SQL that is generally compatible or transformable into different proprietary syntax. In general, mvSQL specifies the operations of a SQL statement that can be transformed into the command syntax for the proprietary SQL language at runtime.

mvSQL can also be converted into a command syntax for data access using systems other than SQL. For example, an mvSQL command could be translated into one or more SOAP messages. The user interface 104 may be, for example, a web page presented in a web browser or a client side application developed using conventional graphical user interface technologies. In general, the user interface may include fields that hold values. For example, the user interface may include input fields which accept input from an input device on the client computer or other user device. The user interface may also include hidden or uneditable fields that store data. The input field may be an HTML input field, check box, radio button, select box, multiple select box, slider, etc. The storage fields may include a hidden field, label, or read only input field. In some scenarios, additional data may be stored in HTTP Cookies (data sent from a website and stored in a user's web browser while the user is browsing that website) or in an HTTP Session (data associated with individual visitors to a web site).

A data definition defines data types for different fields. A data type is a classification identifying one of various types of data, such as numeric, decimal, character, variable length character strings, date time, etc. The data type determines the possible values for a data value. The data type can also determine operations that can be done on the data value. The data type can also define how the data is stored in a persistent data store and in memory.

The query processor can accept the mvSQL statement and the data from the user interface the data definition and generate a SQL statement that can be executed by a relational database. Referring to the second section 110 of FIG. 1, the SQL statement generated by the query processor 108 may include instructions that cause a relational database 106 or in-memory query processing system to perform operations on data that has not been persistently stored in the relational database. For example, the SQL statement may select values from a derived table. In general, a derived table is a temporary table created by means of a subquery in the FROM clause of a SQL SELECT statement. The derived table is specific to the SQL command that creates it. In some implementations, the derived table exists in the non-persistent memory of a computer executing the database and behaves like a standard view or table.

Accessing data in the derived table can be relatively fast because the derived table can exist only in memory. Using the existing relational database 106 process, the SQL statement has the advantage of being processed without requiring an additional overhead in developing, obtaining, or executing a separate in-memory query processor. In contrast, an in-memory query processing system can be optimized to execute queries in memory.

The SQL statement is provided to a relational database 106 for processing. The SQL statement can be executed by the relational database. Referring to the third portion 112 of FIG. 1, results from the SQL statement executed by the relational database 106 can be provided to the user interface 104. For example, the data returned from the SQL statement may be sent to the user interface 104 directly. Alternatively, the data returned from the SQL statement may be further transformed before being provided to the user interface 104.

The user interface 104 can process the provided results. For example, receiving results of a SQL statement that verify that the contents of the fields on the user interface 104 are valid may cause the user interface 104 to identify and highlight one or more fields that contain invalid values. Alternatively or additionally, the user interface 104 may display an error message. In general, the user interface may utilize the results of the SQL statement in order to enhance the experience of the user.

Figure 2:
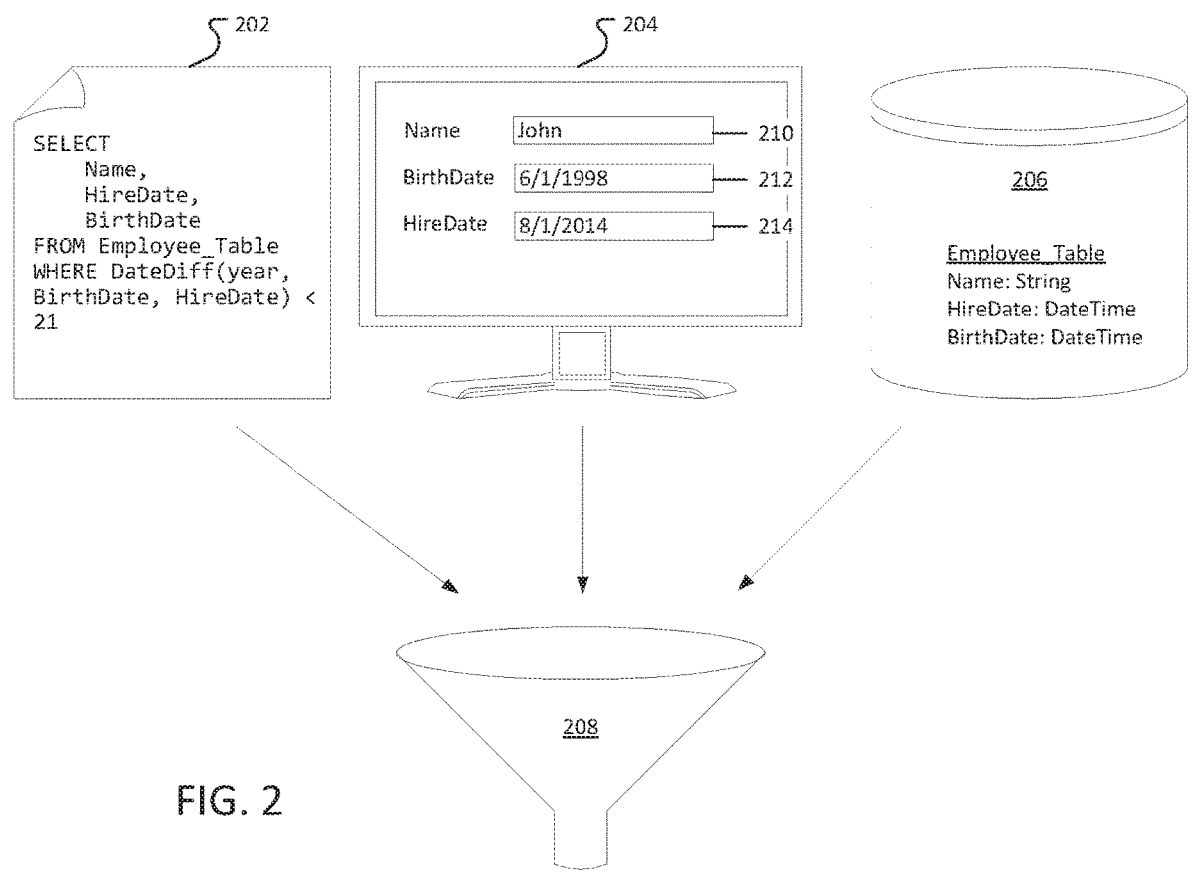
FIG. 2-4 illustrates an example of generating an SQL statement against data on a user interface.

FIG. 2 illustrates an example process of generating an SQL statement. Generally, a query processor 208 can generate an SQL statement using information from a mvSQL statement 202, a user interface 204, and, optionally, a data dictionary 206.

The mvSQL Statement 202 provides instructions for manipulating data. In this example, the mvSQL statement is "SELECT Name, HireDate, Birthdate, FROM Employee_Table WHERE DateDiff (year, BirthDate, HireDate) <21". The mvSQL statement instructs a database to object (select) the values from the columns Name, HireData, and Birthdate from a table named Employee_Table that meet the criteria that the difference between the value in the BirthDate column and the value in the HireDate columns is less than 21 years.

A user interface 204 can be used to obtain data from a user. The user interface 204 includes fields that contain data. Each field has a name. For example, a Birthdate field 212 may be generated based on the html text:
<INPUT type="text" name="Birthdate" maxlength="10">

In this example, the name attribute provides a name by which the field may be referenced (in this example, "Birthdate"). The size attribute indicates the size of the field in characters. The type attribute with the value "text" indicates that the input field is a text field. The possible values for the type attribute depend on the version of HTML standard. For example, other possible values for the type attribute include but are not limited to: button, checkbox, color, date, datetime, datetime-local, email, file, hidden, image, month, number, password, radio, range, reset, search, submit, tel, text, time, url, and week. Not all types are available for all versions of HTML. For example, datetime and datetime-local are only available in HTML5 (i.e. the $5^{th}$ revision of the HTML standard).

In general, the names associated with an input field are not otherwise related to the graphical presentation of the field. The labels shown on the user interface 204 are included for explanatory purposes. The names of the fields are defined within the attributes of the HTML field and are generally not displayed on the screen. Instead, labels located near the input fields may not correspond directly to any attribute of the underlying HTML.

In this example, the user interface 204 includes a Name field 210, a BirthDate field 212, and a HireDate field 214.

A data dictionary 206 includes information about the data on the user interface that can be used to construct the SQL statement. The data dictionary 206 describes the data type of different elements on the user interface. In some implementations, the query processor is programmed to assign a default data type of "string" to any field that does not have a data type defined in the data dictionary, or if no data dictionary is provided.

In some implementations, the data dictionary may be determined using conventional techniques from a database management system and the mvSQL statement. For example, the mvSQL statement references the Employee_Table. By accessing the system catalogs for the relational database, the system can determine a data type for each column in the Employee_Table. In other implementations, the data dictionary may be a separate file or other data structure (for example, a hash table, dictionary, lookup table, etc.) that contains a mapping of different fields to their data types. For example, the Name field is mapped to a string and the HireDate and BirthDate fields are mapped to a datetime.

Figure 3:
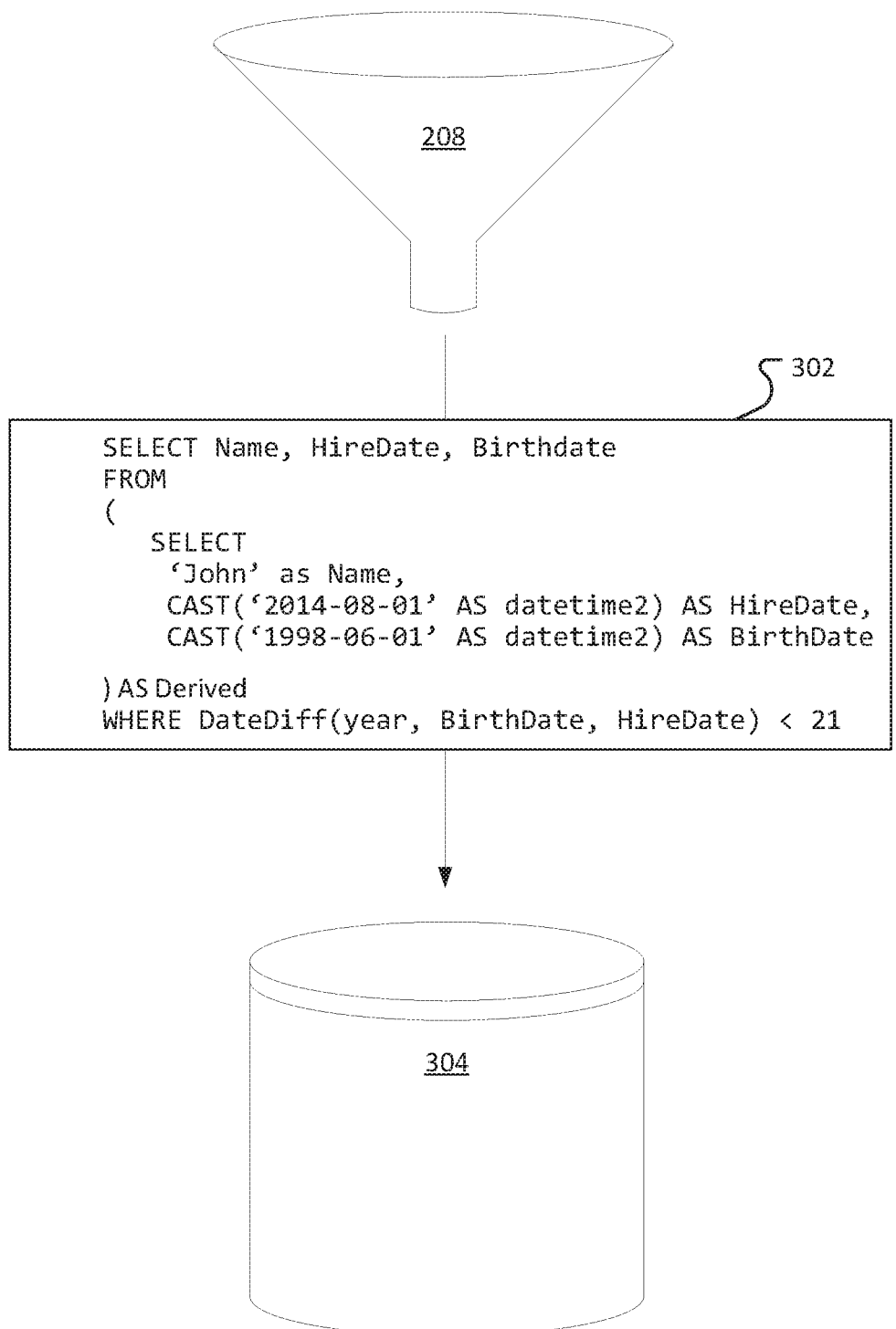

Referring to FIG. 3, the query processor 208 generates a SQL statement 302 using the mvSQL statement, the user interface, and the data dictionary.

The query process can identify columns and tables referenced by the mvSQL statement. In this example, the query processor 208 identifies the columns Name, HireDate, BirthDate and the table Employee_Table. The columns and table may be identified by parsing the mvSQL statement using conventional parsing techniques (for example, regular expressions).

Data from the user interface is mapped into the columns. For each column, the query processor may identify a field on the user interface that corresponds to the column as well as any data type associated with the column. In some implementations, the fields on the user interface are identified by matching the name of the fields in the SQL statement to the fields having the same name on the user interface. In other implementations, the fields on the user interface are identified using a data structure that maps the name of the fields on the user interface to the name of the fields of the mvSQL statement. The data structure can be included in a separate file, table, or other persistent data store. In some implementations, the data structure can be stored on the HTML page displayed in the user interface (for example using hidden fields, scripting, or embedded in the comments).

In this example, the query processor identifies "John" as the "Name," "08/01/2014" as the "HireDate," and "06/01/1996" as the "Birthdate."

The query processor 208 replaces the identified table in the SQL statement with a command to create a derived table. The query processor creates the SQL statement that then creates the derived table using the values obtained from the user interface and applying an alias to the values. An alias is a second name that can be used to reference the data that is the subject of the alias. For example, in SQL the keyword AS is used to assign an alias to the column or a table. The AS keyword is inserted between the column name and the column alias or between the table name and the table alias.

The query processor may also cast some or all of the values into the appropriate data type. Casting is an operation that performs a type conversion that explicitly changes data of one data type (for example, a string) into another (for example, a date). Casting the data from the user interface into a particular type may be necessary for some functionality to work correctly; for example, certain functions can only be performed using data in a particular format. In this example, the query processor casts the "HireDate" and "Birthdate" fields to date time values. In some scenarios, it may be necessary to reformat the data provided by the user interface before the data can be cast into the appropriate type. In this example, the "HireDate" field contains a value in the format "mm/dd/yyyy", where "mm" is a two digit month, "dd" is a two digit day, and "yyyy" is a four digit year. The function that casts the value into a date requires the string to be in the format "yyyy-mm-dd." The query processor 208 can manipulate the data values from the user interface to generate strings in the appropriate formats for casting or other operations.

In this example, the command to create the derived table is "(SELECT 'John' as Name, CAST('2014-08-01' AS datetime2) AS HireDate, CAST('1998-06-01' AS datetime2) AS BirthDate) AS Derived". In this example, derived table includes a single row of data, however, other commands can be used to generate derived tables having multiple rows. In this example, the derived table is provided with an alias ("Derived").

The command to create the derived table is inserted into the SQL statement in place of the table. If the alias of the name of the derived table is different from the name of the table or tables included in the mvSQL statement, then the SQL statement can be updated to reference the derived table (for example, "SELECT DERIVED.NAME, DERIVED.HIREDATE, DERIVED.BIRTHDATE FROM . . . " or alternatively "SELECT DERIVED.* FROM . . . )."

The conditional logic in the where clause of the mvSQL statement remains at the end of the SQL statement.

Figure 4:
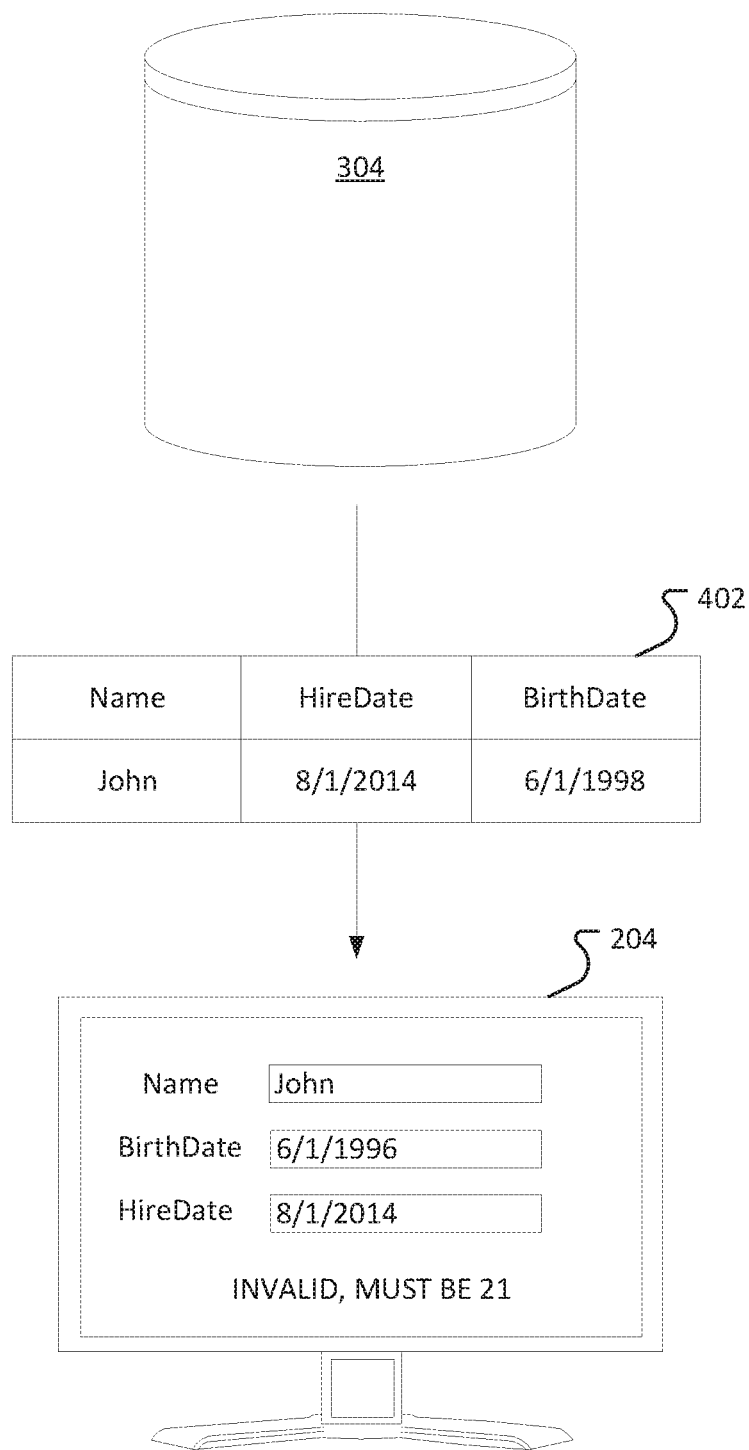

The SQL statement is sent to the database management system 304. The database management system 304 may be the database management system that provided the data dictionary or it may be another database management system. In this example, the database 304 is a relational database. Referring to FIG. 4, the database management system 304 executes the SQL statement. In this example, executing the SQL statement does not require the database management system to access data stored in the tables of the database management system. The SQL statement may also be provided to a standalone query interpreter. For example, as the SQL statement 302 does not rely on a persistent data stored in the database, the statement can be executed by any query interpreter capable of parsing and executing a SQL query.

In this example, the database management system identifies the row in the derived table as meeting the criteria described by the where clause (e.g. the difference between the hire date and the birth date is greater than 21 years). The database management system creates a record set or similar data structure to report the results of the SQL statement. In this example, the record set includes a single data record which includes the details from the derived table.

The user interface 204 receives the record set or receives data from a system that processes the record set. In response, the user interface 204 may update the display to present information. In this example, the user interface presents an error message indicating that the employee must be at least 21 years of age. In some implementations, the query process or other system receives the results of the query. The results of the query can be preprocessed before providing the data to the user interface. For example, a JAVA SERVLET can use the information in the result set to generate a new page to display on the user interface.

Figure 5:
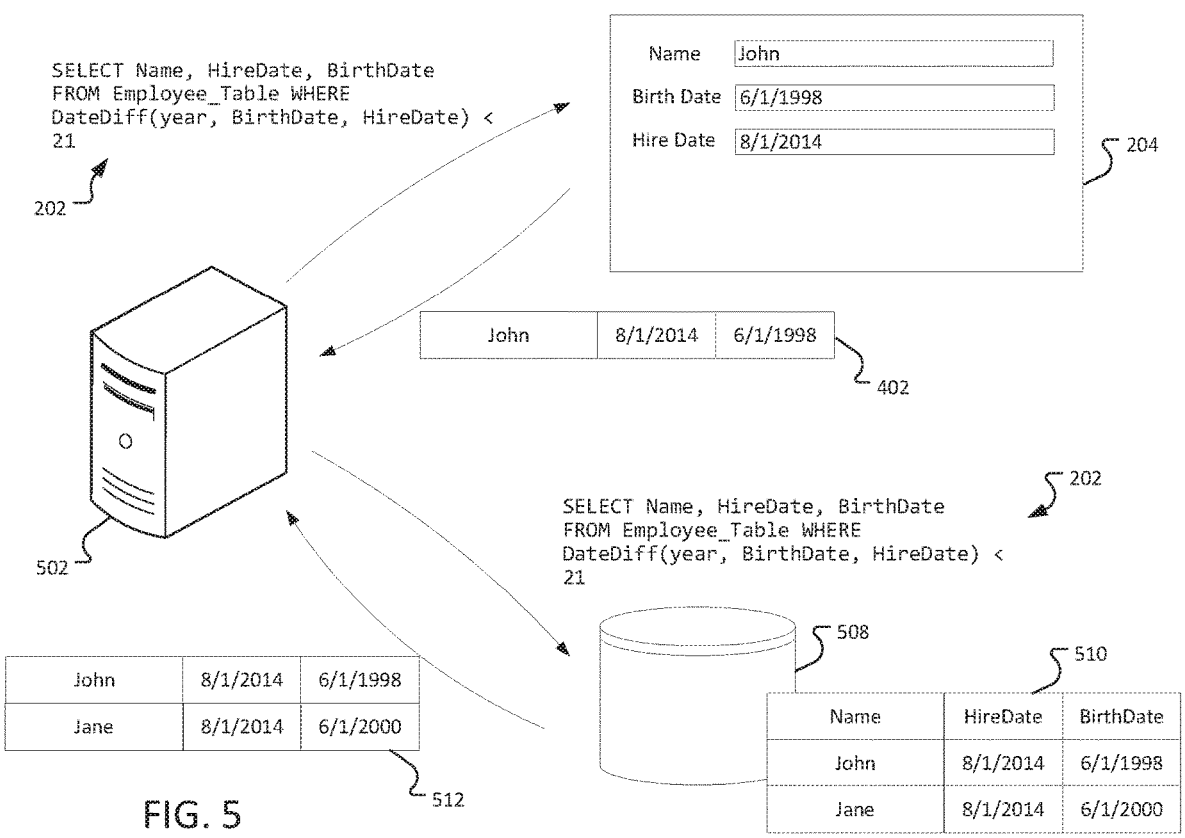
FIG. 5 illustrates an MVSQL statement being used to check data on a user interface and data in a database.

FIG. 5 illustrates an mvSQL statement being used to check data on a user interface and data in a database. The same mvSQL statement can be used to interact with data from a user interface and data stored in a database management system. For example, an application server 502 or other computer system can store mvSQL statements. The statement can be, for example, mvSQL statements that perform data validation. The statements can include, for example, the mvSQL statement 202.

As described above, the mvSQL statement 202 can be executed against the data from within a user interface 204. As described above, executing mvSQL statement 202 against the data on the user interface 204 can include processing the mvSQL statement as described above to generate a new SQL statement, including a derived table.

The mvSQL statement 202 can also be executed against data stored in a database management system 508. In this example, the database management system 508 includes an Employee_Table 510 that stores employee data. The SQL statement 202, when executed against the data in the Employee_Table table, produces two records 512, which are provided to the application server 502.

Figure 6:
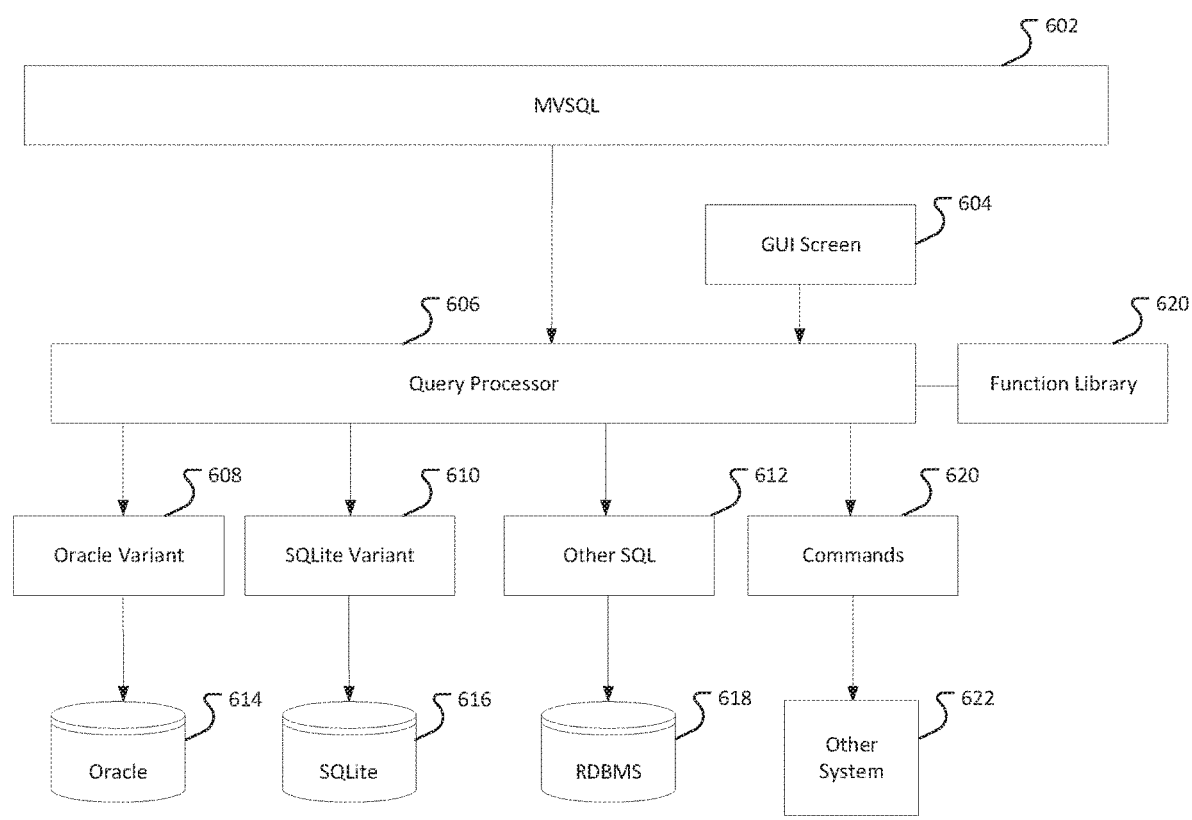
FIG. 6 illustrates transforming the mvSQL statement to different proprietary versions of SQL.

FIG. 6 illustrates the transformation of the mvSQL statement into different proprietary versions of SQL. The mvSQL statement may be further altered to account for variations in the SQL programming language as implemented in different database management systems.

A query processor 606 receives the mvSQL statement 602. The query processor 606 can transform the mvSQL statement 602 into an ORACLE specific variant 608 suitable for execution against an ORACLE database. For example, an ORACLE specific SQL statement for the mvSQL statement, "SELECT Name, HireDate, Birthdate, FROM Employee_Table WHERE DateDiff (year, BirthDate, HireDate)<21," may be:

SELECT Name, HireDate, BirthDate
FROM Employee_Table
WHERE floor(months between(BirthDate, HireDate)/12) <21

The query process 606 can transform the mvSQL statement 602 into a SQLite specific variant 610 suitable for execution against SQLite 616. For example, an SQLlite specific SQL statement for the mvSQL statement, "SELECT Name, HireDate, Birthdate, FROM Employee_Table WHERE DateDiff (year, BirthDate, HireDate)<21," may be:

SELECT Name, HireDate, BirthDate
FROM Employee_Table
WHERE (strftime('% Y', HireDate)–strftime('% Y', BirthDate))–(strftime('% m-% d', HireDate)<strftime('% m-% d', BirthDate))<21

The query processor 606 can also transform the mvSQL statement 602 into other SQL variants 612 to access other relational database management systems (RDBMS) 618. For example, a MICROSOFT SQL SERVER specific variant of the mvSQL statement, "SELECT Name, HireDate, Birthdate, FROM Employee_Table WHERE DateDiff (year, BirthDate, HireDate)<21," may be:

SELECT Name, HireDate, BirthDate
FROM Employee_Table
WHERE DATEDIFF(YEAR, BirthDate, HireDate)<21

A MYSQL specific variant of the mvSQL statement, "SELECT Name, HireDate, Birthdate, FROM Employee_Table WHERE DateDiff (year, BirthDate, HireDate) <21," may be:

SELECT Name, HireDate, BirthDate
FROM Employee_Table
WHERE TIMESTAMPDIFF(YEAR, BirthDate, HireDate)<21

The query processor 606 can also transform the mvSQL statement 602 into commands 620 to create, read, update, and delete data from other third party systems 322. For example, the mvSQL can be transformed into access commands to access data from customer relationship management systems, such as SALESFORCE, enterprise resource management system, such as SAP. Other examples of third party systems 322 include NoSQL databases. NoSQL databases provide mechanisms for storage and retrieval of data that is modeled in means other than the tabular relations used in traditional relational databases. Examples include column databases (such as HBASE), document stores (such as Lotus Nodes, and APACHE COUCH DB), key-value databases (such as ORACLE NOSQL DATABASE), graph databases (such as ALLEGRO), and multi-model databases (such as ORIENTDB).

The query processor 606 can determine the syntax of the final database commands based on, for example, the target of the command. For example, an mvSQL query may be transformed into a ORACLE specific variation of SQL if the target of the statement is ORACLE.

In some implementations, the query processor 606 may identify an operation that has not been implemented in the target data store (either in the proprietary SQL variant or in the third party data store). The functionality provided by the absent operation can be provided by a function that is applied to a result set after the command is executed. The functions can be stored in a function library 620.

For example, the other system 622 may not have the innate ability to concatenate fields. When the query processor receives the mvSQL statement:

SELECT CONCATENATE (first_name, last_name) AS NAME
FROM customer-table
WHERE last_name='Smith'

The query processor 606 may determine that SALESFORCE does not include a concatenate function as part of the API used to access the account. The query processor 606 can check a function library 620 to determine if a function exists to substitute for the CONCATENATE operation. The commands can be compiled functions accessible by the query processor 620 or other systems. In this example, the query processor 606 identifies a function for the CONCATENATE operation.

Accordingly, the query-pre-processor 606 generates commands to obtain the first name and last name from an object in SALESFORCE, without concatenating the results.

http://na3.salesforce.com/services/data/v20.0/query/?q=SELECT FIRST_NAME, LAST_NAME FROM CUSTOMER Once the results are received, the query processor 606 can apply the identified function to each result in the results of data provided in response to the result set (the set of all results provided by the system receiving the command).

For example, if the query processor 606 receives two results:

| FIRST NAME | LAST NAME |
|---|---|
| John | Smith |
| Mary | Smith |

The query processor may concatenate the first name and last name fields to produce a new result set. The new result set can include the results of the operation and can rename the result based on any ALIAS included in the command (in this example, the concatenated field is renamed NAME)

| NAME |
|---|
| John Smith |
| Mary Smith |

In some implementations, a system or component other than the query process 606 can process the result set and apply any identified functions. For example, the system may include a results processor (not shown). In some implementations, the results may be processed by using parallel processing techniques (for example, a map reduce framework, multiple threads, etc.)

The system is capable of performing several optimizations to increase the performance of the system. Examples of the optimizations include retrieving data only when needed, limiting the number of records returned, processing expressions in-memory. Limiting the fields on the records returns, caching requests, and executing in parallel, The system may retrieve data when it is needed by the user. As a matter of practicality, a user cannot view a million records at a time, therefore the system may limits the number of records that are retrieved (for example, to 25, 50, or 100 records). The user can then filter, search and sort to locate a given record.

In order to improve the performance of the system, expressions (like string concatenation) can be evaluated in memory on the web server. For example, the 25 retrieved records can be loaded into the in-memory database (for example, SQLite). The expressions can be evaluated using the in-memory database. In-memory refers to the operational memory of the computer, for example, random access memory (RAM) and dynamic random access memory (DRAM), Because the expressions are evaluated in-memory (for example, on the web server), the operations can be processed relatively fast. This is possible because the system is capable of translating SQL to different vendor dialects and the system a logical model (i.e. the data dictionary) that identifies columns and their data types.

By way of explanatory example, at runtime, the system may execute the following SQLite commands to create the in-memory table, insert records into the table, and evaluate the expressions:

CREATE TABLE Customers_InMemory (FirstName TEXT, LastName TEXT)
INSERT INTO Customers_InMemory (FirstName, LastName) VALUES ('John', 'Smith')
INSERT INTO Customers_InMemory (FirstName, LastName) VALUES ('Mary', 'Smith')
SELECT FirstName ||' '|| LastName AS Name FROM Customers_InMemory The system may perform some additional optimizations. For instance, the system can use heuristics to determine which columns can be excluded. The developer might build a query that's used on several pages. By necessity, the query may include a superset of the columns that are used on each page. At runtime, the system may determine that only a subset of those columns are used on a given page (such as a web page).

For example, the system may that the Name column is not used on the current page. The system may remove the Name column from the mvSQL statement. If the FirstName and LastName columns are not otherwise referenced, the system may determine not retrieve them when querying the underlying data store.

The system may also cache some requests. For instance, assume the system is displaying a list of sales orders. Each sales order references a customer. The developer wants to display the customer name next to each sales order. If several sales orders refer to the same customer, the system may only issue one request to get the customer.

Requests can be executed in parallel. Assume that the system is causing the display of 25 sales orders, and the 25 sales orders reference ten distinct customers. The system may issue ten concurrent requests to get the customer records.

Figure 7:
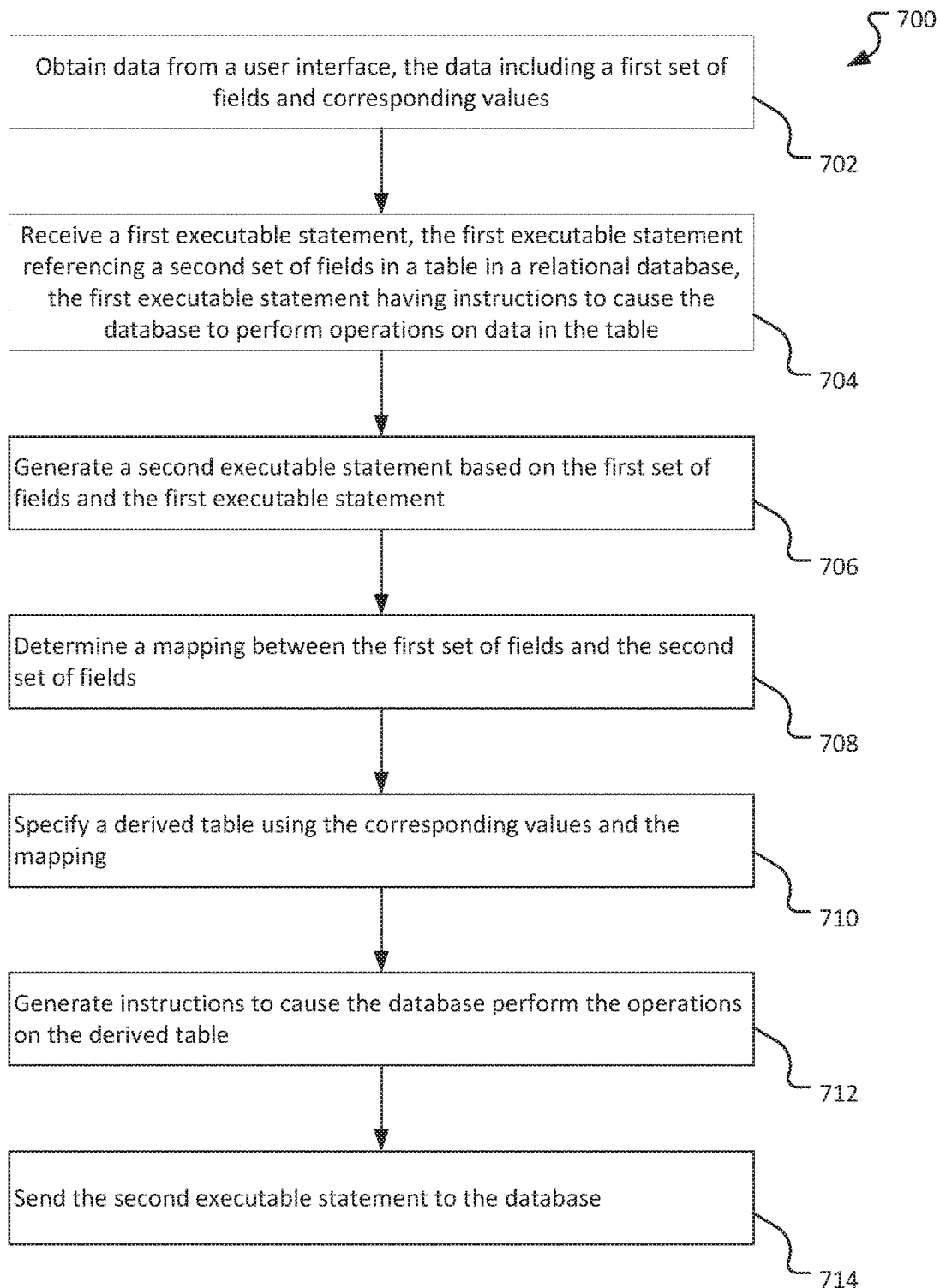
FIG. 7 is a flowchart of a process for using a source independent query language on data from a user interface.

FIG. 7 is a flowchart of a process 700 for using a source independent query language on data from a user interface. The process can be performed by one or more computers operating sequentially or in parallel. The process can be performed using conventional distribution programming techniques with some of the steps in the process being performed in parallel.

The process 700 obtains data from a user interface, where the data includes a first set of fields and corresponding values (702). The values can be obtained from the user interface using, for example, a scripting programming language that retrieves data from the user interface and sends that data to a server. The values can also be obtained through the submission of a form on the user interface.

The process 700 receives a first executable statement, where the first executable statement references a second set of fields in a table in a relational database. The first executable statement also having instructions to cause the database to perform operations on data in the table (704). The first executable statement can be, for example, an mvSQL statement.

The process 700 generates a second executable statement based on the first set of fields and the first executable statement (706). The second executable statement is configured to perform the operations described in the first executable statement on the data from the user interface.

Generating the second executable statement includes determining a mapping between the first set of fields and the second set of fields (708). In order to generate the second executable statement, the system identifies columns in the first executable statement and maps the columns of the first executable statement to the data from the user interface. Mapping the columns to the data can include identifying a data type associated with the data. For example, if the column is numeric, but the data is a string, the system can convert the data into the appropriate type, or it can provide instructions that cause the second executable statement to perform the conversion.

The generation of the second executable statement also includes specifying a derived table using the corresponding values and the mapping (710). The process 700 can construct a command to generate a derived table using the data from the user interface, including any data conversion operations that were identified.

Generating the second executable statement also includes instructions to cause the database to perform the operations on the derived table (712). In some implementations, the process 700 can insert the command to generate the derived table into the SQL statement in place of the table or tables identified in the from clause of the statement.

The process 700 sends the second executable statement to the database (714). The database can receive the second executable statement and perform the operations described by the statement on the data identified by the derived table.

Figure 8:
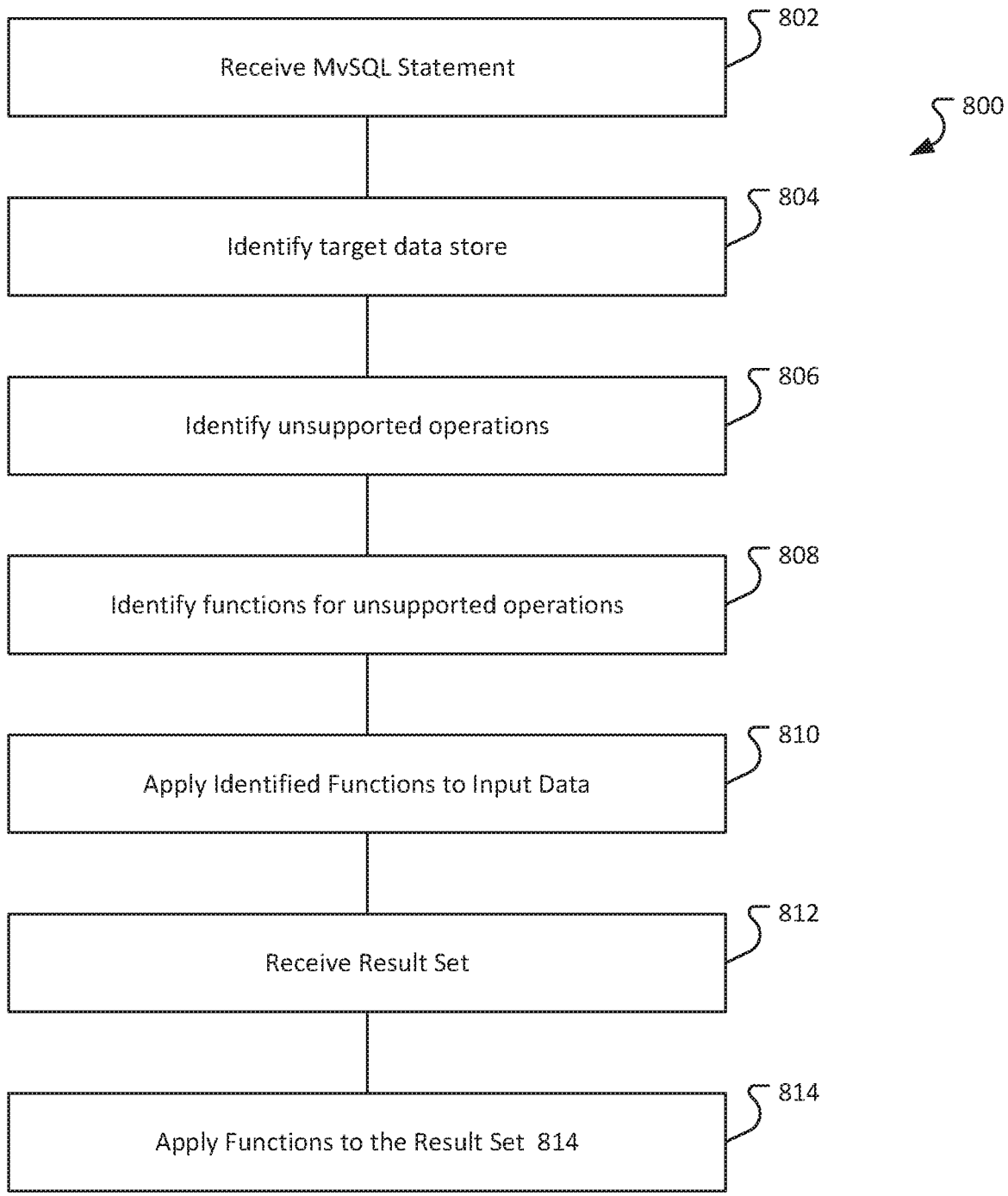
FIG. 8 is a flow chart of an example process for providing functions for unsupported operations.

FIG. 8 is a flow chart of an example process for providing functions for unsupported operations. The process can be performed by one or more computers operating sequentially or in parallel. The process can be performed using conventional distribution programming techniques with some of the steps in the process being performed in parallel.

A mvSQL statement is received 802. The target data store is identified 804. The target data store is the data storage system which is being queried. As described above, the target data store can be a relational database, a NoSQL data store, etc.

Unsupported operations are identified 806. The system can identify operators and/or operations within the mvSQL statement. The system checks whether the operator and/or operations are supported by the target data store. In some scenarios, the functionality indicated by an operation may be supported by the target data store but the name may be different. For example, the functionality indicated by a CONCATENATE operation may be available in a database, but may be named CONCAT. A query processor can replace the CONCATENATE with CONCAT and allow the target data store to perform the operation. In some scenarios, the functionality indicated by the operation may not be supported natively by the target data store. For example, the target data store may not have an operation which provides concatenation of two or more data elements.

Functions for unsupported operations are identified 808. If the system determines that the target data store does not support the operation in the mvSQL statement, the system can check if a function in the function library can support the operation. In some implementations, the function library may include a look-up table that indexes available functions based a corresponding mvSQL operation. For example, the system may find an entry in the lookup table for the CONCATENATE operation. The entry may provide a pointer to a function. The pointer may be, for example, a name of a function that can be accessed using a dynamic library, class, etc. The pointer may also be, for example, a memory location where the function may be found. In some implementations, if no function is identified for an operation then an error is thrown.

Identified functions are applied to input data 810. Some parameters are necessary to the proper execution of some commands. For example, a SQL update or insert statement requires input data in order to complete the statement. SQL select statements may include conditional clauses (e.g. WHERE clauses) that are used to limit the data requested. Some of these inputs may be modified by operations that are unsupported by the target data store. In this scenario, the functions may be applied to the input data before the command is executed. For clarity, the statements below are shown in an otherwise standard SQL format. The specific implementations of SQL or other commands may vary as described above. In this, the command:

SELECT CONCATENATE (Address, City, State)
FROM CUSTOMER
WHERE NAME=CONCATENATE('John', 'Smith')
May be changed to the mvSQL command
SELECT CONCATENATE (Address, City, State)
FROM CUSTOMER
WHERE NAME='John Smith'

By applying a concatenate function to "John" and "Smith." Note, that at this point the CONCATENATE function in the select clause remains.

Data access commands are created 812. The system can generate one or more commands for the target data store. In addition to transforming the mvSQL statement in commands specific to the target data store, the system can remove the identified function. In some implementations, the identified functions can be removed while applying the functions to the input data 810, above.

Continuing the example above, the command may be transformed into

SELECT Address, City, State
FROM CUSTOMER
WHERE NAME='John Smith'

A result set is received 812. The result set is the data returned by the target data store in response to the data access commands.

The identified functions are applied 814 to the data in the result set, as described above.

In some scenarios, a function may be applied to data that is both an input and an output. For example, a function can be applied to a subquery, the results of the function may be provided to the main query as an input. The system may generate multiple data access commands. For example, one set of commands may be generated for the subquery. The subquery, the commands for the subquery may be executed. The function may be applied to the results. The results of the function may be used to generate a second set of commands corresponding to the query.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage medium for execution by, or to control the operation of, data processing apparatus).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include (in addition to hardware) code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages and/or declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic disks, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-transitory computer-readable media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual, auditory, or tactile feedback) and input from the user can be received in any form, including acoustic, speech, or tactile input. In addition, a computer can interact with a user by sending documents to and receiving documents from a device that is used by the user (for example, by sending web pages to a web browser on a user's client device in response to requests received from the web browser).

Embodiments of the subject matter described in this specification can be implemented in a computing system that includes a back-end component (e.g., as a data server), a middleware component (e.g., an application server), or a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining data from a user interface, the data including a first set of fields and a first set of field values;
   obtaining a first structured query language (SQL) statement, the first SQL statement referencing a second set of fields of a dataset of a data source, the first SQL statement including one or more operations configured for operating on the dataset of the data source;
   mapping the first set of fields to the second set of fields based on the first set of field values of the first set of fields in the data from the user interface, wherein the mapping comprises:
      identifying a first data type of a field in the first set of fields;
      identifying a second data type of a field in the second set of fields; and
      generating an instruction for converting the first data type to the second data type;
   generating, based on the mapping, at least one command configured to perform the one or more operations on the first set of fields and the first set of field values of the data from the user interface, the at least one command including the instruction for converting the first data type to the second data type and another instruction for performing the one or more operations;
   generating a second SQL statement that includes the at least one command;
   causing execution of the second SQL statement on the data from the user interface; and
   generating a response to the first SQL statement based on execution of the second SQL statement on the data from the user interface, wherein execution of the second SQL statement is independent of accessing the second set of fields of the dataset of the data source.

2. The computer-implemented method of claim 1, wherein the data source includes a NoSQL database.

3. The computer-implemented method of claim 1, wherein the at least one command includes a command syntax that is a proprietary variation of an SQL programing language.

4. The computer-implemented method of claim 1, further comprising:
   identifying an operation not supported by the data source; and
   determining a function from a function library capable of performing the operation.

5. The computer-implemented method of claim 4, further comprising:
   determining whether the operation applies to an input or an output; and
   in response to determining the operation applies to an input:
      performing the function against information provided in the first SQL statement, and
      including a result of the function in the at least one command.

6. The computer-implemented method of claim 4, further comprising:
   determining whether the operation applies to an input or an output; and
   in response to determining the operation applies to an output:
      generating the at least one command absent the operation,
      providing the at least one command to the data source, and
      applying the function to a result provided by the data source in response to the at least one command.

7. A non-transitory computer storage medium encoded with computer program instructions that when executed by one or more processors, cause the one or more processors to perform operations comprising:
   obtaining data from a user interface, the data including a first set of fields and a first set of field values;
   obtaining a first SQL statement, the first SQL statement referencing a second set of fields of a dataset of a data source, the first SQL statement including one or more operations configured for operating on the dataset of the data source;
   mapping the first set of fields to the second set of fields based on the first set of field values of the first set of fields in the data from the user interface, wherein the mapping comprises:
      identifying a first data type of a field in the first set of fields;
      identifying a second data type of a field in the second set of fields; and
      generating an instruction for converting the first data type to the second data type;
   generating, based on the mapping, at least one command configured to perform the one or more operations on the first set of fields and the first set of field values of the data from the user interface, the at least one command including the instruction for converting the first data type to the second data type and another instruction for performing the one or more operations;
   generating a second SQL statement that includes the at least one command;
   causing execution of the second SQL statement on the data from the user interface; and
   generating a response to the first SQL statement based on execution of the second SQL statement on the data from the user interface, wherein execution of the second SQL statement is independent of accessing the second set of fields of the dataset of the data source.

8. The non-transitory computer storage medium of claim 7, wherein the data source includes a NoSQL database.

9. The non-transitory computer storage medium of claim 7, wherein the at least one command includes a command syntax that is a proprietary variation of an SQL programing language.

10. The non-transitory computer storage medium of claim 7, further comprising:
   identifying an operation not supported by the data source; and
   determining a function from a function library capable of performing the operation.

11. The non-transitory computer storage medium of claim 10, further comprising:
   determining whether the operation applies to an input or an output; and
   in response to determining the operation applies to an input:
      performing the function against information provided in the first SQL statement, and
      including a result of the function in the at least one command.

12. The non-transitory computer storage medium of claim 10, further comprising:
   determining whether the operation applies to an input or an output; and
   in response to determining the operation applies to an output:
      generating the at least one command absent the operation,
      providing the at least one command to the data source, and
      applying the function to a result provided by the data source in response to the at least one command.

13. A system comprising:
   one or more processors and one or more storage devices storing instructions that are operable, when executed by the one or more processors, to cause the one or more processors to perform operations comprising:
   obtaining data from a user interface, the data including a first set of fields and a first set of field values;
   obtaining a first SQL statement, the first SQL statement referencing a second set of fields of a dataset of a data source, the first SQL statement including one or more operations configured for operating on the dataset of the data source;
   mapping the first set of fields to the second set of fields based on the first set of field values of the first set of fields in the data from the user interface, wherein the mapping comprises:
      identifying a first data type of a field in the first set of fields;
      identifying a second data type of a field in the second set of fields; and
      generating an instruction for converting the first data type to the second data type;
   generating, based on the mapping, at least one command configured to perform the one or more operations on the first set of fields and the first set of field values of the data from the user interface, the at least one command including the instruction for converting the first data type to the second data type and another instruction for performing the one or more operations;
   generating a second SQL statement that includes the at least one command;
   causing execution of the second SQL statement on the data from the user interface; and
   generating a response to the first SQL statement based on execution of the second SQL statement on the data from the user interface, wherein execution of the second SQL statement is independent of accessing the second set of fields of the dataset of the data source.

14. The system of claim 13, wherein the data source includes a NoSQL database.

15. The system of claim 13, wherein the at least one command includes a command syntax that is a proprietary variation of an SQL programing language.

16. The system of claim 13, further comprising:
identifying an operation not supported by the data source; and
determining a function from a function library capable of performing the operation.

17. The system of claim 16, further comprising:
determining whether the operation applies to an input or an output; and
in response to determining the operation applies to an input:
performing the function against information provided in the first SQL statement, and
including a result of the function in the at least one command.

18. The system of claim 16, further comprising:
determining whether the operation applies to an input or an output; and
in response to determining the operation applies to an output:
generating the at least one command absent the operation,
providing the at least one command to the data source, and
applying the function to a result provided by the data source in response to the at least one command.

19. The method of claim 1, further comprising:
identifying a data type associated with one or more fields of the first set of fields; and
identifying a conversion operation for converting the field values of the first set of fields to the data type associated with the one or more fields of the first set of fields.

20. The method of claim 1, further comprising:
generating a derived table using the data from the user interface, the derived table specifying the mapping of the first set of fields to the second set of fields and specifying one or more data conversion operations.

* * * * *